United States Patent [19]

Sakakida et al.

[11] Patent Number: 5,419,583

[45] Date of Patent: May 30, 1995

[54] AIR BAG DEVICE FOR AN AUTOMOTIVE VEHICLE

[75] Inventors: Masafumi Sakakida; Toshiyuki Manabe; Tomofumi Saitoh, all of Hiroshima, Japan

[73] Assignee: Mazda Motor Corporation, Hiroshima, Japan

[21] Appl. No.: 121,429

[22] Filed: Sep. 16, 1993

[30] Foreign Application Priority Data

Sep. 16, 1992 [JP] Japan .................................. 4-246480
Sep. 22, 1992 [JP] Japan .................................. 4-253112

[51] Int. Cl.⁶ ............................................. B60R 21/16
[52] U.S. Cl. .................................. 280/728.2; 280/732
[58] Field of Search ............... 280/728 A, 728 B, 732, 280/743 R

[56] References Cited

FOREIGN PATENT DOCUMENTS

| 2-155855 | 6/1990 | Japan . | |
| 303051 | 10/1992 | Japan | 280/728 A |
| 648 | 1/1993 | Japan | 280/728 A |
| 24497 | 2/1993 | Japan | 280/728 B |

Primary Examiner—Kenneth R. Rice
Attorney, Agent, or Firm—Fish & Richardson

[57] ABSTRACT

An air bag device for an automotive vehicle which comprises an air bag module disposed in an instrument panel of the vehicle, an air bag lid which opens when an air bag in the air bag module is inflated, and a plate for absorbing an impact. The plate is connected to an air bag case and comprises an outer wall of the air bag module extending toward an inner surface of said air bag lid.

17 Claims, 4 Drawing Sheets

AIR BAG DEVICE FOR AN AUTOMOTIVE VEHICLE

BACKGROUND OF THE INVENTION

1. Field of the Invention

The present invention relates to an air bag device for an automotive vehicle, and more particularly to an air bag device which is installed in a space inside an instrument panel or a dashboard so as to protect an occupant of a passenger seat in a front passenger compartment during a collision of the automotive vehicle. The air bag is inflated from a folded state in a reaction can during the collision.

2. Description of the Related Art

In general, an air bag device, for protecting the passenger sitting on the passenger seat, is installed in the instrument panel. The air bag device has an air bag module for holding the air bag and its ignition equipment in an air bag case. The air bag device also includes an air bag lid for covering an opening formed in the instrument panel. The air bag lid is opened by the pressure of the air bag when the air bag is inflated.

In the above air bag device, when the automotive vehicle decelerates at some value above a predetermined value, an impact sensor detects a sudden deceleration of the vehicle. The signal from the impact sensor causes the ignition equipment to operate so that the air bag inflates to protect the passenger.

However, in some situations the vehicle decelerates at a value which is smaller than that necessary to trigger inflation of the air bag. In this case, it is possible that the passenger could hit their head on the instrument panel or the air bag lid. Thus, it is desirable to make a large space in the instrument panel so as to position the air bag module away from the air bag lid thereby protecting the passenger from the air bag module in the above situation.

Japanese Unexamined Laid-open Patent Application 2-155855 discloses an air bag device wherein a number of slots are formed in the side walls of the air bag case for absorbing the impact. Thus, this reference proposes that the air bag module can be positioned near the air bag lid and both the air bag lid and the instrument panel can absorb the impact by their deformation.

However, even though it is possible to locate the air bag module near the inner surface of the instrument panel in the above prior art, this design requires slots in both side walls. This structure requires increased manufacturing time and expenses to make the side walls as well as in selecting the shape of the slot and the material of the air bag.

SUMMARY OF THE INVENTION

It is an object of the present invention to provide a structure which is able to absorb passenger impact using a simple structural modification of the air bag device.

In order to achieve the above mentioned object, the present invention provides an air bag device for an automotive vehicle, which comprises an air bag module disposed in an instrument panel of the vehicle, an air bag lid for opening when an air bag in the air bag module is inflated, and a plate and/or hinge for absorbing impact, connected with an air bag case comprising an outer wall of the air bag module and extending toward an inner surface of the air bag lid.

BRIEF DESCRIPTION OF THE DRAWINGS

The above objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
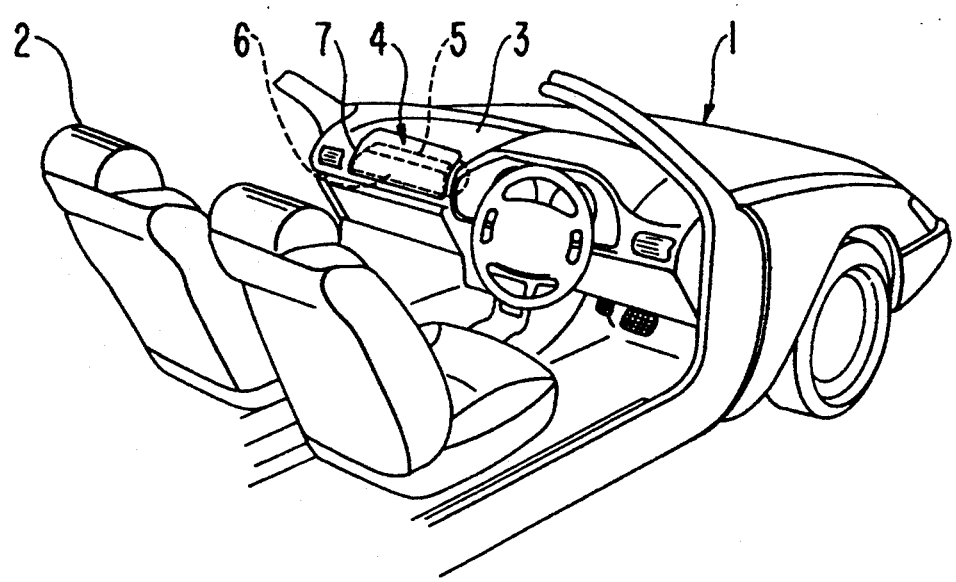
FIG. 1 is a perspective view of an interior portion of an automotive vehicle dashboard with an air bag device in accordance with an embodiment of the present invention.

FIG. 1 illustrates an instrument panel structure or a dashboard 3 of an automotive vehicle 1 equipped with an air bag device 4 in accordance with the preferred embodiment of the present invention. The air bag device 4 is installed in a space inside the instrument panel or the dashboard 3 to protect an occupant of a passenger seat 2 in a front passenger compartment. The air bag device 4 comprises an air bag module 5 supported in the instrument panel 3 and an air bag lid 6 which opens when the air bag device 4 is inflated.

An opening 7 formed in the instrument panel 3 is covered by the air bag lid 6.

Figure 2:
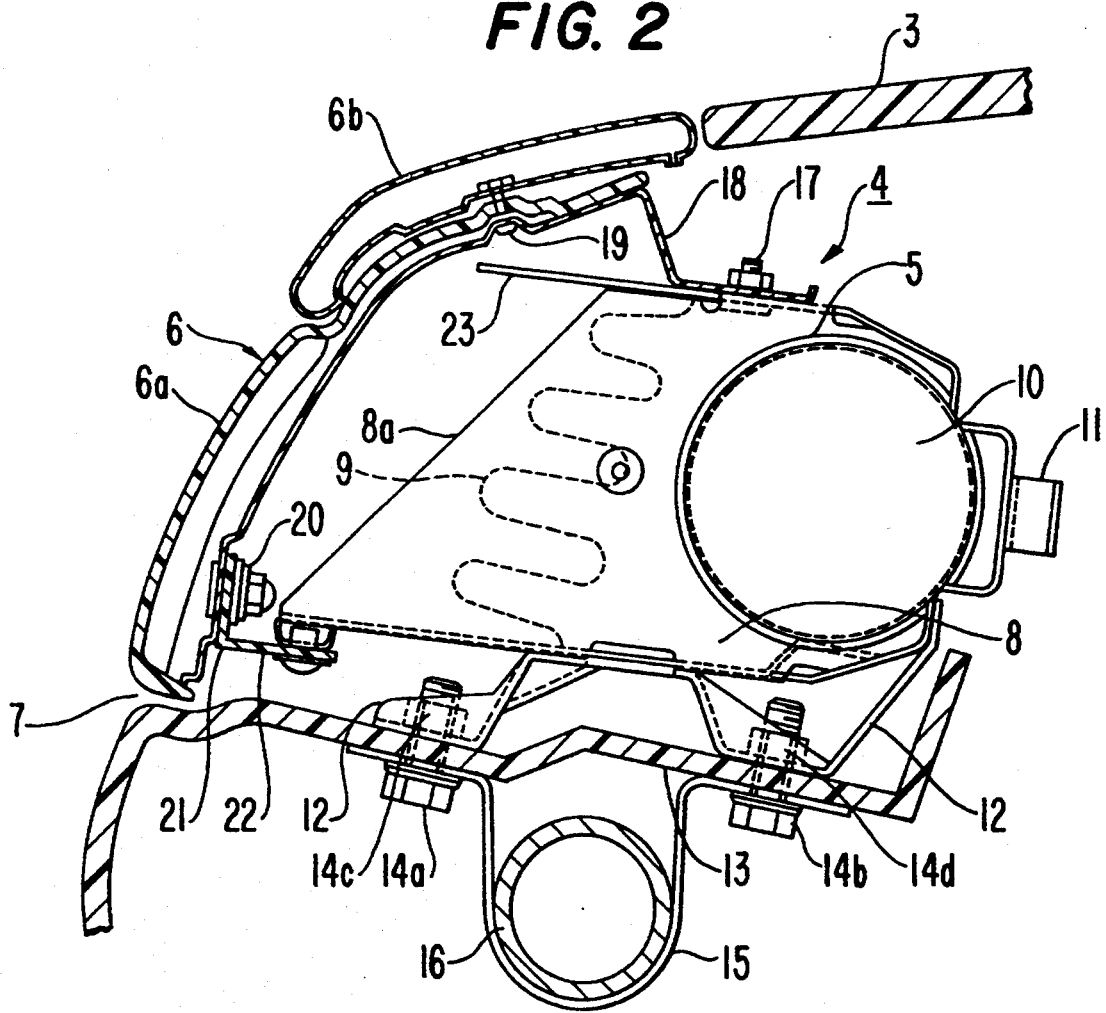
FIG. 2 is a cross sectional view of the instrument panel and air bag device in accordance with a first embodiment of the present invention.

FIG. 2 illustrates the air bag module 5 which comprises an air bag 9, an inflater 10, and ignition equipment 11 in an air bag case 8 which is opened toward the passenger seat 2. When an impact sensor (not shown) detects sudden deceleration of the vehicle 1, the ignition equipment 11 is operated based on the signal of the impact sensor. If the signal indicates that the sudden deceleration is above a predetermined value, the ignition equipment triggers the inflater 10. As the result, the passenger sitting on the passenger seat 2 is protected by the inflation of the air bag 9.

The air bag module 5 is fixed on a plate 13 extending forward in the vehicle from a lower edge of the opening 7 of the instrument panel 3. Specifically, a bracket 12 of the air bag case 8 is attached to a bracket 15 which is secured to a steering support member 16 by bolts 14a and 14b and nuts 14c and 14d by way of the plate 13.

The air bag lid 6 covers the opening 7, especially in this embodiment. The lid 6 comprises a main lid portion 6a which covers the opening 7 and a protection cover portion 6b extending upwardly and forwardly from an upper end of the main lid portion 6a. The main lid portion 6a comprises a solid plastic form and the protection cover portion 6b comprises a hollow plastic form.

The air bag lid 6 is connected with the air bag module 5 by way of a hinge 18 which is fixed at one end of the hinge 18 to an upper surface of the air bag case 8 by a bolt 17.

In this embodiment, the hinge 18 extends downwardly along an inner surface of the main lid portion 6a and is fixed at an upper portion and a lower portion of the main lid portion 6a by bolts 19 and 20, respectively.

On the other hand, the air bag lid 6 is connected with the lower end of the air bag case 8 positioned adjacent the passenger seat 2 by way of a connection member 21. The connection member 21 comprises a plastic member which is fixed to the hinge 18 by bolt 20.

The connection member 21 has a notch 22 which assists in breaking the connection member 21 as the air bag 9 is inflated. This allows the air bag lid 6 to open smoothly as the air bag inflates.

Further, in the above embodiment, a passenger side opening 8a of the air bag case 8 is slanted upwardly and forwardly in the automotive vehicle 1 when viewed from the side. Therefore, a space is formed than between an upper portion of the air bag case 8 and the air bag lid 6. This space is larger than a space between a lower portion of the air bag case 8 and the lower portion of the air bag lid 6. In other words, the distance between an upper portion of the air bag case 8 and an upper portion of the air bag lid 6 is larger than the distance between a lower portion of the air bag case 8 and a lower portion of the air bag lid 6.

A plate 23 for assisting in absorbing the impact is mounted on the upper portion of the air bag case 8 by the bolt 17 which also fixes the hinge 18 to the air bag case 8. The plate 23 comprises a material capable of a plastic deformation so as to be able to absorb some of the impact (for example, spring steel).

Thus, this embodiment can protect the passenger when the automotive vehicle 1 suddenly decelerates upon impact but that impact is not so great as to trigger inflation of the air bag 9.

Figure 3:
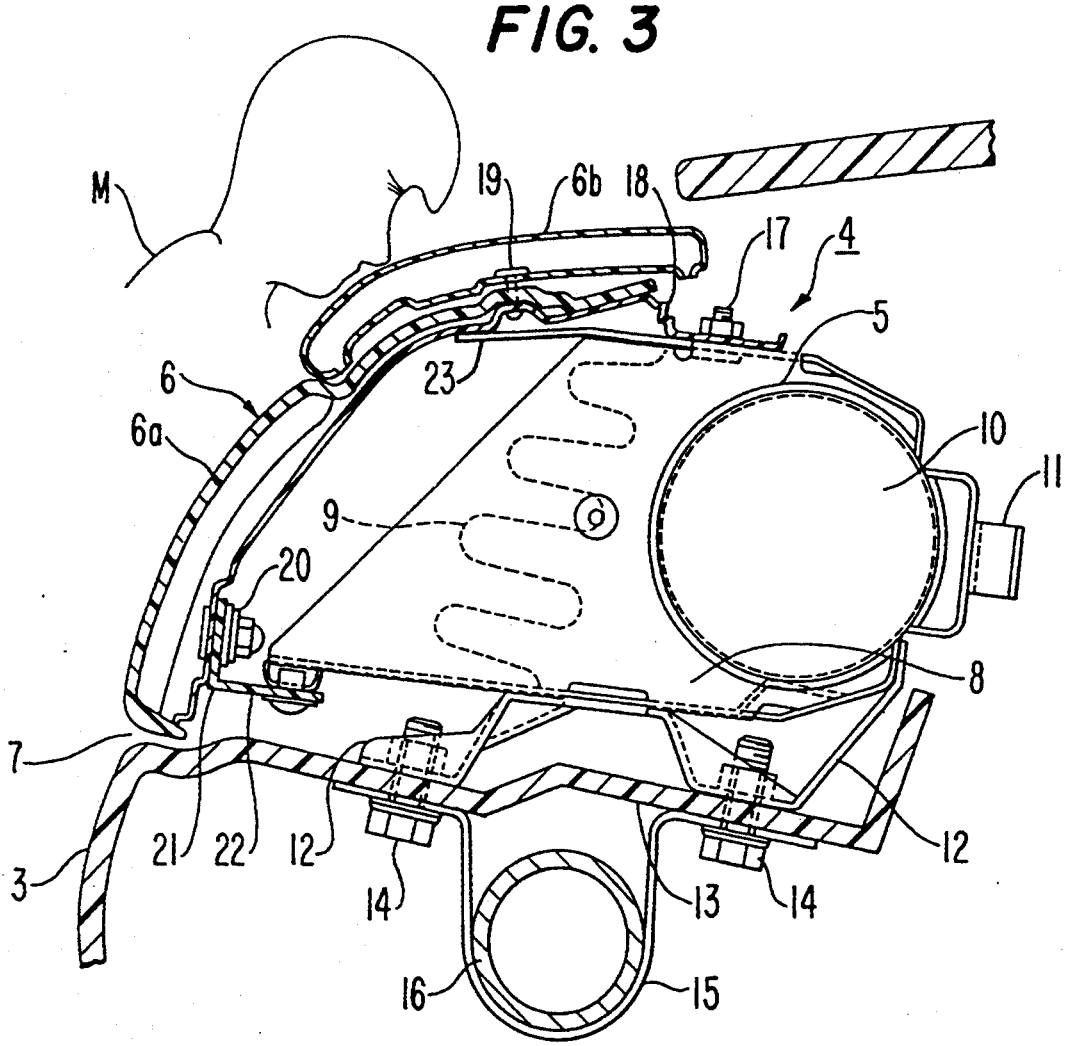
FIG. 3 is a cross sectional and operational view of the instrument panel and air bag device in accordance with a first embodiment of the present invention when a passenger sitting on a passenger seat hits his head on the instrument panel.

When the vehicle receives an impact which is smaller than an impact that inflates the air bag device 4, the passenger M is protected by the deformation of the instrument panel structure 3 and particularly hinge 18 as shown in FIG. 3. In such a case, the air bag lid 6 contacts the plate 23 which assists in absorbing the impact and while the air bag lid 6 is deformed. Hinge 18 is also deformed during this time. Therefore, the energy of forward motion of the passenger M is absorbed by the hinge 18 and plate 23.

Depending on the material selected for the hinge 18 and plate 23, the amount of plastic deformation and thus the amount of energy absorption can be adjusted and improved.

Furthermore, since the hinge 18 is fixed to the air bag case 8 with the plate 23, assembly time and assembly quality can be improved.

Figure 4:
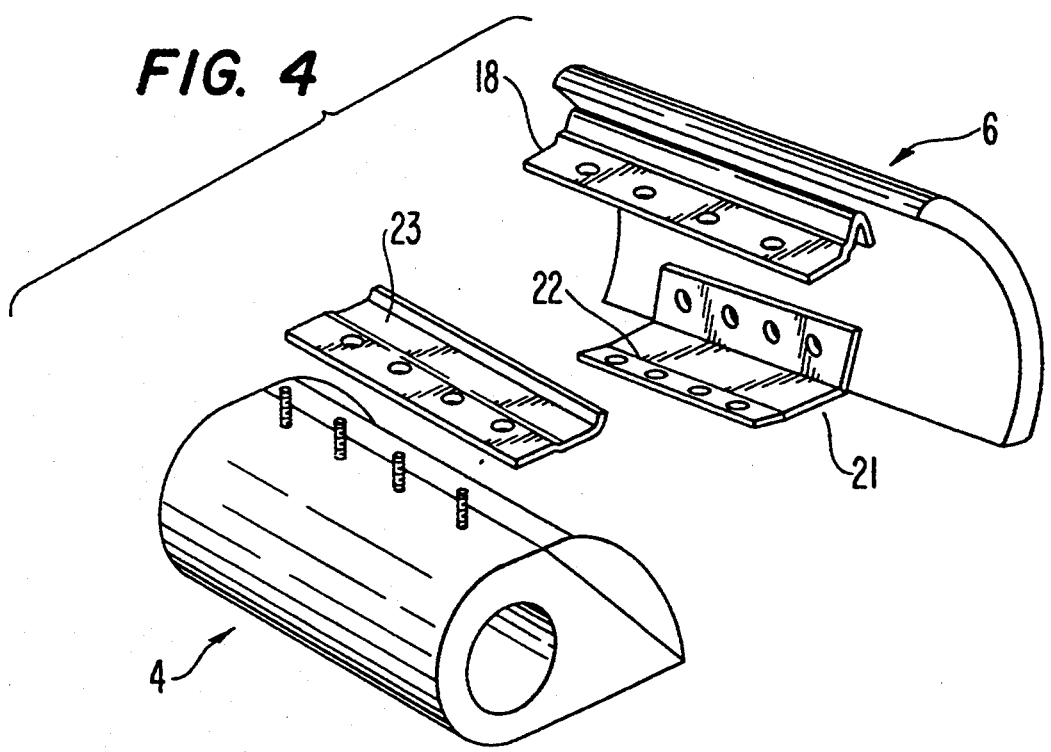
FIG. 4 is a perspective view of an air bag lid and an air bag case in accordance with a second embodiment of the present invention.
Figure 5:
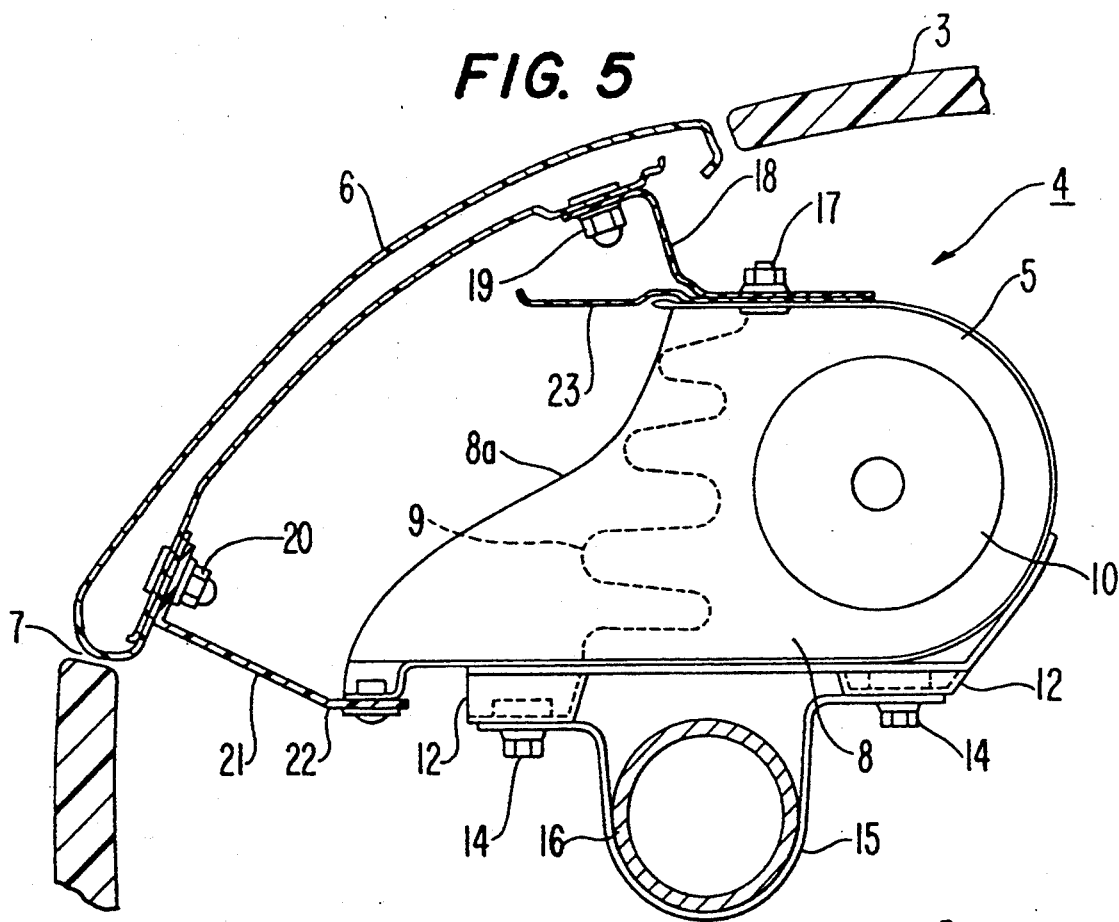
FIG. 5 is a cross sectional view of the instrument panel and air bag device in accordance with the second embodiment of the present invention.

FIGS. 4 and 5 are views showing a second embodiment illustrating the shape of a modified air bag lid 6, case 8, hinge 18, and plate 23. Similar parts have been labeled with the same reference numerals and a detailed explanation of these elements has been omitted for brevity of description.

In this embodiment, the case 8 has a modified opening 8a and the end of the plate 23 facing the passenger is curved upwardly. The plate 23 includes a ridge which mates on a corresponding ridge on the air bag case 8. Between this ridge on plate 23 and the upwardly curved end, the plate 23 is substantially flat.

The air bag lid 6 in this embodiment comprises a hollow plastic form. The hinge 18 is only connected with the upper portion of the air bag lid 6 by bolt 19. Bracket 15 is fixed to the brackets 12 by bolts 14.

In this embodiment, since the sides of the opening 8a and the end of the plate 23 are rounded, the air bag is able to inflate smoothly without damaging the air bag 9.

Figure 6:
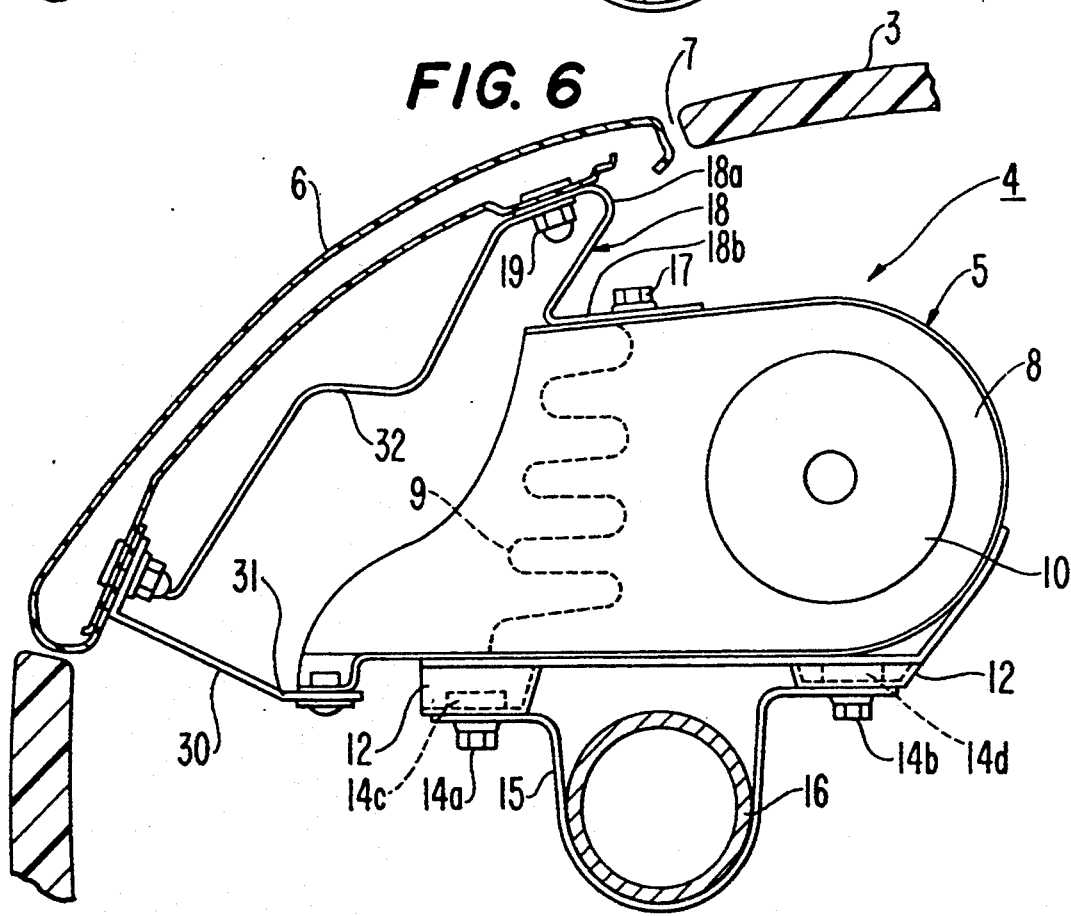
FIG. 6 is a cross sectional view of the instrument panel and air bag device in accordance with a third embodiment of the present invention.

FIG. 6 is a cross sectional view showing a third embodiment of the invention. In this embodiment, the air bag module 5 is also fixed on the steering support member 16 by way of a bracket 15 which is attached to the brackets 12 by the bolts 14a and 14b and the nuts 14c and 14d. The air bag lid 6 covers with the opening 7, and comprises a hollow plastic form similar to FIG. 5.

One end portion of the air bag lid 6 is fixed to the upper surface of the air bag case 8 by bolt 17 via hinge 18. The other end portion of the lid 6 is connected with the air bag module 5 by connecting member 30. One end of the hinge 18 is fixed to the upper and inner portion of the lid 6 by bolt 19 and the other end portion of the hinge 18 is fixed to the air bag module 5 by bolt 17.

Figure 7:
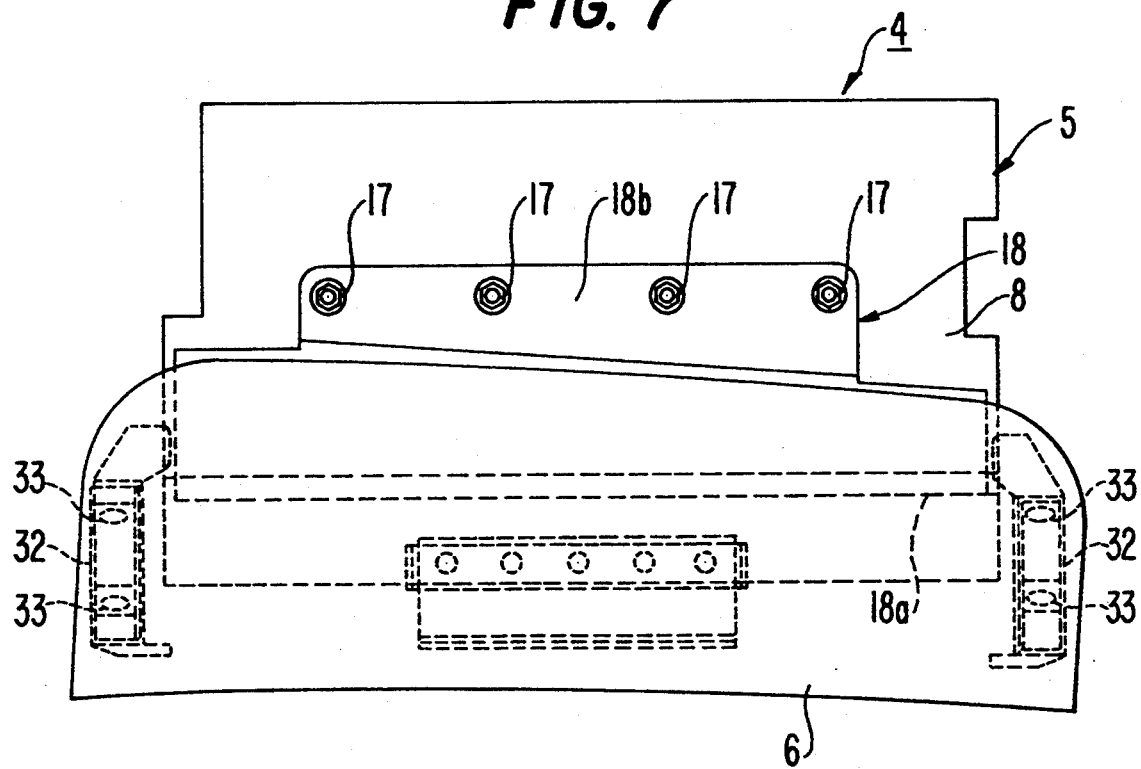
FIG. 7 is a plan view indicating a relationship the air bag lid and a hinge in accordance with the third embodiment of the present invention.
Figure 8:
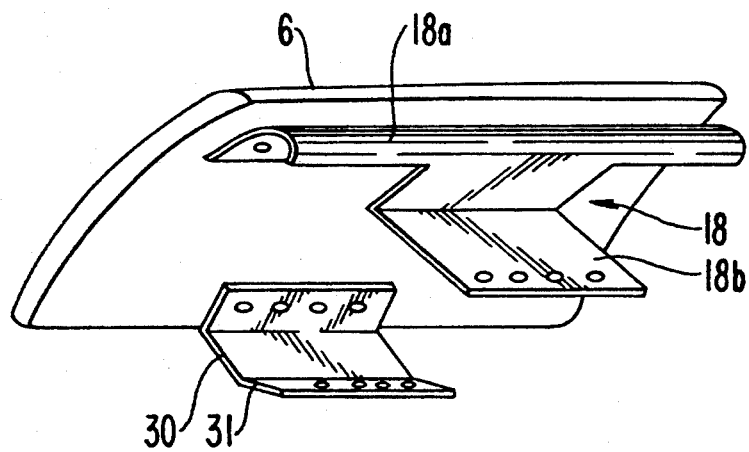
FIG. 8 is a perspective view of the air bag lid, the hinge and a connection member in accordance with the third embodiment of the present invention.

As shown in FIGS. 7 and 8, the hinge 18 is fixed at the upper side of the air bag lid 6 and has a width which is approximately the same as the width of the lid 6. The hinge 18 comprises a Z-shaped plate 18a for attaching it to the inner surface of the lid 6, and a plate 18b extending from a portion of the plate 18a so as to attach it to the air bag module 5. In this embodiment, the plate 18a has two edges of the Z-shaped plate to absorb the impact of the passenger if their head hits the air bag lid 6. In other words, when the vehicle impact is less than an amount to operate the air bag device and the passenger contacts their head to the air bag lid 6, the impact is absorbed by a plastic deformation of the two edges of the Z-shaped plate.

The air bag lid 6 is connected at its lower portion to the air bag case 8 by way of a connection member 30 which has a notch 31 for assisting in the opening operation of the air bag lid 6 as described above.

Furthermore, in this embodiment, there are plates 32 attached to the inner surface of lid 6 and each is positioned in a longitudinal direction of the vehicle body. Each of the plates 32 has a hole 33 for locating itself to a projection (not shown) positioned at the opening 7 of the instrument panel 3.

In these embodiments, the air bag device 4 functions as a protection for the passenger when the automotive vehicle 1 suddenly decelerates upon impact. In such a case, the air bag lid 6 pushes on plates 18a and 18b which deform for absorbing the impact. The lid 6 and plates 18a and 18b absorb the forward energy of the passenger.

Hinge 18 can be attached to the lid in a simple and high quality assembly operation so as to reduce costs and decrease the number of total parts.

Furthermore, in this embodiment, the width of the plate 18b is smaller than the width of the plate 18a. Therefore, even if the passenger's head contacts the air bag lid 6, this structure can provide enough impact adsorption and still allow a smooth opening of the lid 6 if the air bag is inflated.

In this embodiment, the plate 18b is formed of a flat plate, but the plate may have a stepped portion comprising a vertical surface and a horizontal surface.

Accordingly, these embodiments disclose structures which greatly reduce the impact energy without requiring a complicated structure.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. An air bag device for an automotive vehicle, comprising:
    an air bag module disposed in an instrument panel of the vehicle, said air bag module including an air bag and an air bag case;
    an air bag lid disposed so as to open when said air bag in said air bag module is inflated; and
    a plate for absorbing impact being connected to said air bag case, said plate comprising a wall of said air bag module extending toward an inner surface of said air bag lid.

2. An air bag device as defined in claim 1, wherein said plate is attached to an upper wall of said air bag case.

3. An air bag device as defined in claim 2, further comprising a hinge which is connected between said air bag lid and said air bag module.

4. An air bag device as defined in claim 2, wherein said plate comprises a material capable of plastic deformation.

5. An air bag device as defined in claim 1, wherein said air bag case has an opening allowing inflation of said air bag toward said air bag lid, and said air bag device includes a space formed between the opening and the inner surface of the air bag lid, the space being sized such that a distance between an upper portion of said air bag case and an upper portion of said air bag lid is longer than a distance between a lower portion of said air bag case and a lower portion of said air bag lid, and said plate extending into an upper portion of the space.

6. An air bag device as defined in claim 5, wherein said air bag case is shaped so that an edge of said air bag case defining a portion of the opening slants in an upwardly and forward direction of the vehicle when viewed from a direction transverse to a longitudinal axis of the vehicle.

7. An air bag device as defined in claim 1, wherein said air bag case has an opening allowing inflation of said air bag toward said air bag lid;
    said plate has an end portion extending toward said air bag lid which is curved upwardly and has a middle portion having a ridge adjacent to an edge of said air bag case for locating said plate.

8. An air bag device as defined in claim 7, wherein said plate has another end portion positioned on said air bag case.

9. An air bag device as defined in claim 1, wherein one end portion of said plate is connected with said air bag case and another end portion of said plate is connected to said air bag lid.

10. An air bag device as defined in claim 9, wherein a width of said one end portion of said plate extending in a transverse direction is equal to or smaller than a width of said other end portion.

11. An air bag device as defined in claim 10, wherein said other end portion extends from approximately a middle of the width of said one end portion of said plate.

12. An air bag device as defined in claim 10, wherein the width of said other end portion of said plate is approximately equal to a width, extending in the transverse direction, of said air bag lid.

13. An air bag device as defined in claim 10, wherein said plate functions as a hinge connecting said air bag lid and said air bag module thereby allowing said air bag lid to open when said air bag is inflated.

14. An air bag device for an automotive vehicle, comprising:
    an air bag module disposed in an instrument panel of the vehicle, said air bag module including an air bag and an air bag case;
    an air bag lid disposed so as to open when said air bag in said air bag module is inflated; and
    an impact absorption means for absorbing energy from a passenger when the passenger contacts said air bag lid following a sudden deceleration of said automotive vehicle, said impact absorption means including a z-shaped hinge member connecting said air bag lid with an upper portion of said air bag module.

15. An air bag device as defined in claim 14, further comprising an impact sensor for detecting a value indicative of an amount of deceleration.

16. An air bag device for an automotive vehicle, comprising:
    an air bag module disposed in an instrument panel of the vehicle, said air bag module including an air bag and an air bag case;
    an air bag lid disposed so as to open when said air bag in said air bag module is inflated;
    a plate connected to an upper portion of said air bag case, said plate extending toward an inner surface of said air bag lid; and
    a hinge connected between an upper portion of said air bag lid and the upper portion of said air bag case, said hinge and said plate being capable of absorbing impact by deformation.

17. An air bag device as defined in claim 16, wherein an end of said plate disposed closer to said air bag lid being curved in an upward direction.

* * * * *